United States Patent [19]
Mueller et al.

[11] 3,792,650
[45] Feb. 19, 1974

[54] CAMERA FOCUS INDICIA SYSTEM
[75] Inventors: Arthur C. Mueller, Niles; Donald W. Irkfetz, Mt. Prospect, both of Ill.
[73] Assignee: Bell & Howell Company, Chicago, Ill.
[22] Filed: July 31, 1972
[21] Appl. No.: 276,647

[52] U.S. Cl. ..................... 95/44 R, 352/171, 355/59
[51] Int. Cl. ............................................. G03b 13/16
[58] Field of Search ...... 88/1.5 R; 352/171; 355/59; 95/42, 44, 45

[56] References Cited
UNITED STATES PATENTS
| | | | |
|---|---|---|---|
| 2,919,623 | 1/1960 | Tronnier | 95/44 C X |
| 3,174,416 | 3/1965 | Heerklotz | 95/44 R |
| 2,917,968 | 12/1959 | Nojiri | 95/44 R X |

Primary Examiner—Samuel S. Matthews
Assistant Examiner—Richard A. Wintercorn

[57] ABSTRACT

A camera system having means for registering the focal condition of the lens system of the camera. The system includes a camera lens shiftable between multiple focus positions and a view finder for viewing the subject image sensed by the lens system. Focus indicia are arranged to be illuminated in the view finder, and masking means are provided to mask the illumination selected focus indicia in response to the focal condition of said lens system.

5 Claims, 6 Drawing Figures

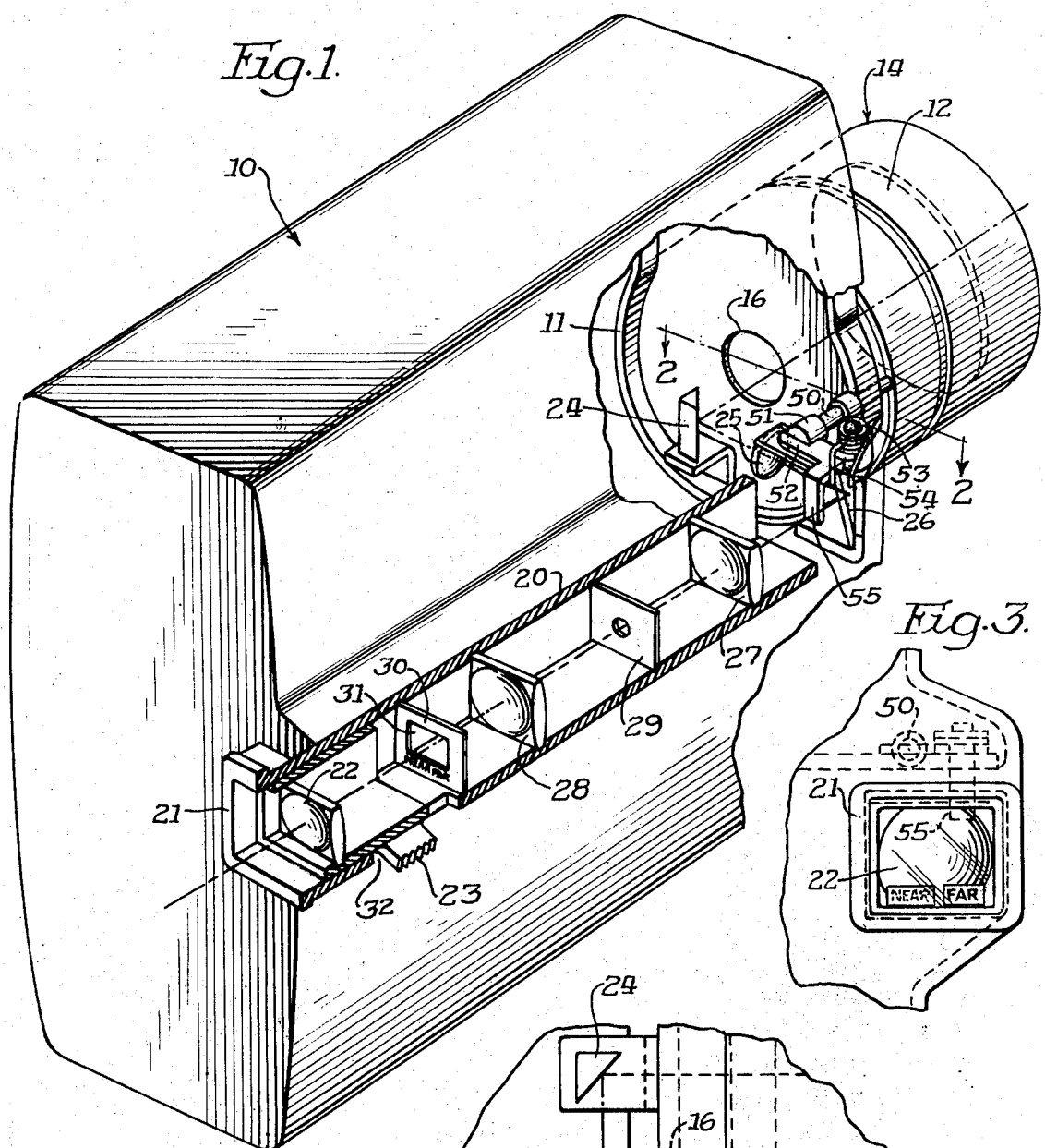
Fig.1.
Fig.3.
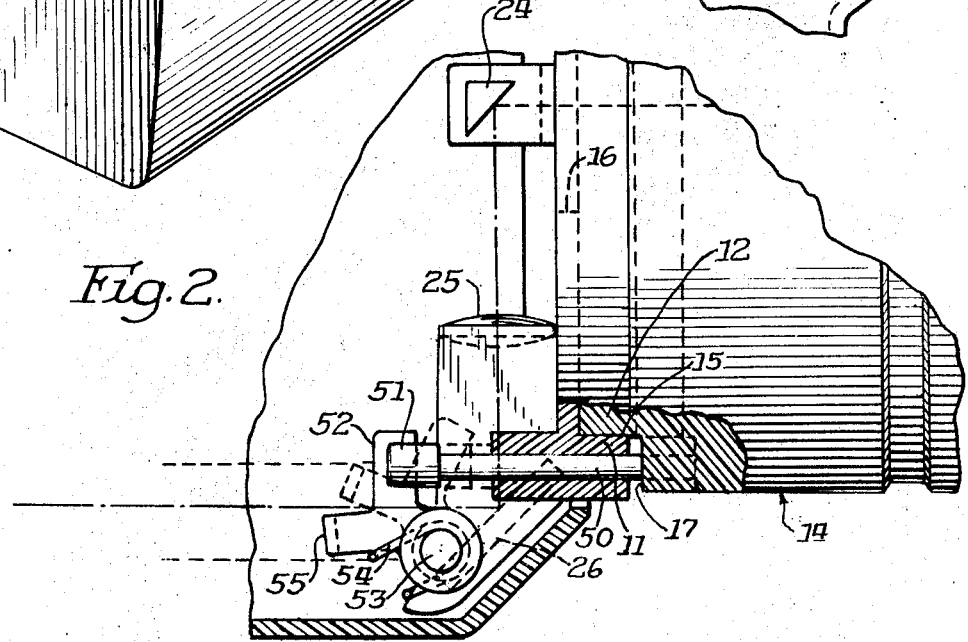
Fig.2.

CAMERA FOCUS INDICIA SYSTEM

BACKGROUND AND GENERAL DESCRIPTION OF THE INVENTION

This invention relates generally to a system for registering or indicating the focusing condition of a motion picture camera or the like.

The trend in the camera industry generally, and in the motion picture camera aspects of the industry in particular, is toward simplification of camera design. The goal is to render modern camera equipment as fool-proof as possible, so that high-quality pictures can be taken by amateur photographers. One of the areas in which camera design has been simplified is in the area of camera focusing. To simplify the picture-taking process, general purpose cameras have been made to include relatively slow speed lenses which have a substantial depth of field, so that the exact focusing is not necessary for pictures of acceptable quality. Different subject distances are handled in such general purpose cameras by providing the camera with multiple focusing zones. The camera thus can be adjusted to focus generally on objects which are at a substantial distance from the camera focal plane by adjusting the camera lens system to a "far" focus condition. Alternatively, nearer objects can be brought into general focus by adjusting the lens system in the camera to a "near" focus condition. The lens design could be modified to also include three or more focusing zones.

The present invention relates to a general purpose camera incorporating such multiple zone focusing. The camera includes a multi-position zone focusing lens focusable on objects close to or distant from the camera. The camera further includes a registration or indicia system for quickly and automatically indicating to the camera user the focus condition of the camera lens. The camera user is thereby advised of the focus setting of the lens before the picture-taking process begins. Hence, adjustment of the focus can be accomplished to suit a particular situation without unnecessary film wastage, and without exposing pictures which are out of focus.

Briefly described, the camera embodying the features and advantages of the present invention includes a primary lens system having a plurality of focusing positions, such as positions for "near" and "far" focusing. A view finder is provided to allow the camera user to view an image of the field of view of the lens. Representative of each focusing position of the primary lens system, indicia are arranged to be illuminated and visible within the view finder. Furthermore, masking means are joined between the lens system and the view finder and operate to block the illumination to said indicia selectively, so that the indicia remaining illuminated and visible within the view finder represents the focal condition of the camera primary lens system.

EXEMPLARY EMBODIMENT

Further objects and advantages of the present invention will become more apparent from the following description of several embodiments thereof when taken in conjunction with the accompanying drawings in which:

FIG. 1 is a perspective view, in partial section, of a motion picture camera incorporating the features and advantages of the present invention;

FIG. 2 is an enlarged plan view of a portion of the camera focus indicia system, as viewed along the line 2—2 in FIG. 1;

FIG. 3 is an enlarged view of the focus indicia system of the present invention, as viewed through the view finder of the camera illustrated in FIG. 1;

Figure 4:
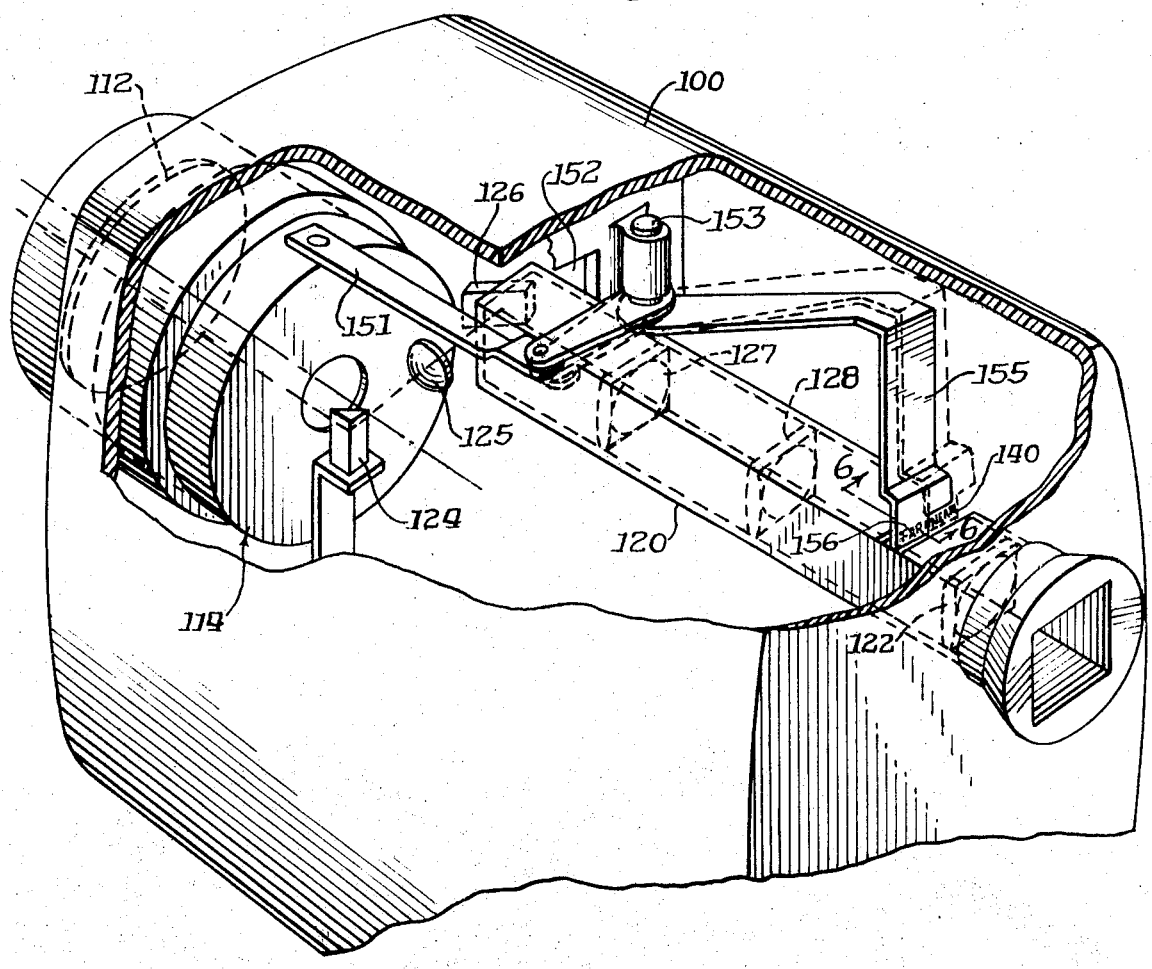
FIG. 4 is a perspective view, in partial section, of a motion picture camera embodying a modified zone focusing and focus indicia system in accordance with the present invention.

A motion picture camera including an embodiment of the present invention is indicated generally in FIGS. 1 through 3 by the reference numeral 10. As well-known by those skilled in the art, the camera 10 includes suitable film storage and driving means for incrementally advancing the frames of a supply of motion picture film into the focal plane of the camera 10. An objective or primary lens system 12 is carried on the front portion of the camera 10 within a cylindrical movable lens barrel 14. An exposure aperture 16 is provided in the front end of the camera 10 in optical alignment with the primary lens 12, to admit light gathered by the lens 12 onto the focal plane of the camera 10. The lens 12 thereby functions to expose the film frames to the image in the field of view of the camera in the usual manner.

The lens barrel 12 is mounted on the camera 10 in a manner which permits a portion of the barrel 14 to telescope with respect to the camera. Hence, the barrel 14 and the lens 12 can be shifted to change the focusing condition of the camera. As seen in FIGS. 1 and 2, the inner end of the lens housing 12 includes a reduced cylindrical neck 15. The neck 15 is received within a close tolerance, within a female ring member 11 provided on the front of the camera 10. The ring member 11 is concentric to the exposure aperture 16. The neck 15 of the housing 12 defines an annular abutment shoulder 17, as seen in FIGS. 1 and 2. By this arrangement, the neck 15 is mated within the ring 11 and the lens barrel 14 can be telescoped with respect to the camera 10.

The telescoping of the lens barrel 14 will displace the primary lens 12 axially with respect to the camera 10 and thereby change the focus of the camera. Generally, the telescoping of the barrel 14 outwardly will move the lens 12 away from the focal plane of the camera 10, and will thereby focus the camera for near or close up subjects. Alternatively, the shifting of the lens barrel 14 inwardly toward the camera will adjust the position of the primary lens 12 with respect to the focal plane of the camera so that the camera is focused for far or distant subjects. As shown in FIG. 2, the engagement between the neck 15 and the camera body 10 limits the inward telescoping movement of the lens barrel 14. In the same regard, suitable stop means (not shown) are provided within the lens housing 12 to limit the outward telescoping movement of the lens barrel 14.

The camera 10 in accordance with this invention further includes a view finder 20. The view finder 20 is channel-shaped in configuration and functions to permit the camera user to view an image of the field of view sensed by the primary lens 12 during the picture taking process. The view finder 20 includes an eye piece 21. A peek-in mirror 24 is provided in optical alignment with the primary lens 12 at an approximate angle of 45° to the lens axis. As seen in FIG. 2, a secondary focusing lens 25 is provided in the camera 10 at a right angle to the lens 12 and in alignment with the mirror 24. A second 45° mirror 26 is also positioned in the path of the lens 25. The mirrors 24 and 26 and the lens 25 are arranged to create an aerial image of the picture transmitted by the primary lens 12 adjacent the second mirror 26. This aerial subject image is aligned with the view finder 20, and hence can be projected into the view finder to inform the camera user of the field of view of the camera. A magnifying lens 22 is positioned in the view finder 20 to enlarge the image. The lens 22 is adjustable by a lever 23 to permit the view finder to be adjusted to the visual acuity of the camera user.

The primary lens 12 provided in the camera 10 operates through the lens 25 to create an inverted and reversed aerial image. Accordingly, the view finder 20 includes a pair of relay lenses 27 and 28 which operate to invert and reverse the aerial image created by the lenses 12 and 25. Thus, the camera user will be able to view a properly oriented image in the view finder 20. An aperture plate 29 is positioned in the view finder 20 between the spaced pair of relay lenses 27 and 28 to control the light rays forming a scene image within the view finder 20.

In accordance with this invention, the view finder 20 provided in the camera 10 also includes an image mask 30. The mask 30 has a frame opening 31 which defines the outline of the image viewed in the view finder 20. Furthermore, the lower portion of the mask 30 is provided with focus indicia which indicate to the camera user the condition of focus for the primary lens 12. In the embodiment shown in FIGS. 1 through 3, the focusing indicia comprises a print of the words "near" and "far" on a transparent portion of the mask 30. Light transmitted through the view finder 20 will normally illuminate the indicia so that they can be read easily by the camera user.

In accordance with this invention, the camera 10 is provided with a system which responds to the position of the lens barrel 14 to automatically register indicia which indicates the focus condition of the camera. In this manner, the camera user is informed of the focus condition, and can make any necessary adjustments in the camera focus before the picture-taking process is initiated. To accomplish such an arrangement, the camera 10 includes a movable positioning pin 50. As shown in FIG. 2, the positioning pin 50 is located adjacent the ring 11 on the front wall of the camera 10, and extends into engagement with the shoulder 17 defined by the lens barrel 14. As evident from FIGS. 1 and 2, the axial movement of the barrel 14 between its "near" and "far" positions will likewise move the positioning pin 50 a corresponding axial distance with respect to the camera ring 11. The inner end of the pin 50 includes a head portion 51 which is frictionally coupled with a rocker arm 52. The rocker arm 52 is pivotally mounted within the camera 10 on a stationary shaft 53. Further, a coil spring 54 provided around the shaft 53 is arranged to bias the rocker arm 52 clockwise, as viewed in FIG. 2. The spring 54 thereby urges the positioning pin 50 outwardly into constant engagement with the shoulder 17 of the lens barrel 14.

The rocker arm 52 additionally includes a downwardly projecting image flag 55. As indicated in FIGS. 2 and 3, the flag 55 is dimensioned and positioned so that it extends downwardly into the line of sight of the reflecting mirror 26. The position for the flag 55 is selected with respect to the aerial image created by the lenses 12 and 25 so as to mask a selected portion of the light being transmitted into the view finder 20 by the lenses 12 and 25. More specifically, the flag 55 is dimensioned to block or mask the light rays which would otherwise illuminate either the "near" or "far" indicia provided on the lower portion of the view finder mask 30. As seen in FIG. 3, since the subject image is inverted by the lenses 12 and 25, the location of the flag 55 at the upper right hand portion of the mirror 26, as viewed axially through the view finder 20, will operate to block the light rays which otherwise would be transmitted to the lower left-hand portion of the mask 30. Thus, in the position indicated in FIG. 3, the flag 55 will blank out the "near" indicia on the mask 30. In this condition, the indicia "far" is illuminated in the view finder 20, and the camera user looking into the view finder 20 is informed that the lens barrel 14 is positioned to focus the camera 10 in the "far" or distant range. In the same regard, movement of the lens barrel 14 outwardly, to focus the camera in a "near" range, will cause the spring 54 to rotate the rocker arm 52 and simultaneously drive the pin 50 and the flag 55 in a clockwise direction, as viewed in FIG. 2. As indicated by the phantom lines in FIG. 2, the movement of the lens barrel 14 to an outward position moves the flag 55 to the upper left-hand portion of the mirror 26, as viewed axially through the view finder 20. In that position, the flag 55 blocks the light rays which would otherwise illuminate the "far" indicia provided in the lower right-hand portion of the mask 30. The camera user thereby sees the illuminated indicia "near" when looking into the view finder 20. The system according to this invention thus automatically illuminates indicia within the view finder 20 which informs the camera user of the focal condition of the lens 12.

Figure 5:
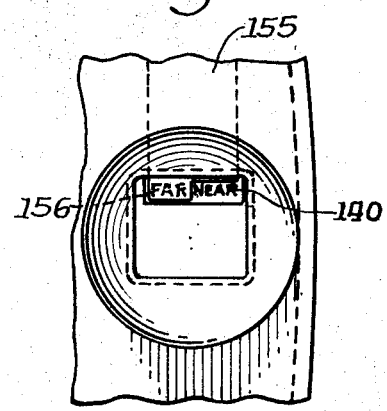
FIG. 5 is an enlarged view of the modified focusing indicia system, as viewed through the view finder of the camera illustrated in FIG. 4.
Figure 6:
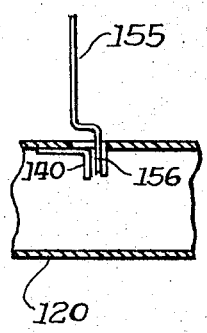
FIG. 6 is a cross-sectional view of the modified focus indicia system, as viewed along the line 6—6 in FIG. 4.

FIGS. 4 through 6 illustrate a second embodiment of the camera focus indicia system in accordance with the present invention. As illustrated therein, a camera 100 is provided with a primary lens system 112. Focusing of the lens system 112 is accomplished by a slideable cylindrical lens barrel 114. The camera 100, like the camera 10 described above, also includes a view finder 120 through which the user of the camera 100 can view the field of vision of the primary lens system 112. A set of peek-in mirrors 122 and 126 set at 45° angles, reflects the image of the lens system 112 along a selected path and into the view finder 120. A pair of relay lens 127 and 128 orient the light rays and transmit the image through the view finder 20.

In the camera 100 the image is framed by the rectangular dimensions of the view finder 120. In this second embodiment, the view finder 20 includes suitable focusing indicia comprising a transparent tab 140 which projects downwardly into the line of sight of the view finder 120. One portion of the transparent tab 140 is printed with indicia "far" and the other portion is printed with the indicia "near", or other suitable indicia. Thus, both indicia are normally illuminated by the light transmitted into the view finder 120 by means of the reflecting mirrors 122 and 126.

In the embodiment illustrated in FIGS. 4 through 6, the focusing indicia provided on the tab 14 is selectively masked by a movable flag lever 155. As seen in FIGS. 5 and 6, a lower portion 156 of the flag 155 is dimensioned to mask out either the "far" or the "near" indicia on the tab 140. This lower flag portion 156 is dimensioned to project downwardly into the view finder 120 behind the tab 140, and operates to block out the light rays which would otherwise illuminate the tab 140.

The flag 155 is pivotally mounted on a fixed pivot pin 153 provided on the camera 100. A crank arm 152 is connected to the pin 153 and the flag 155 and is also connected to a link 151 joined to the movable lens barrel 114.

As evident from FIG. 4, the axial shifting of the lens barrel 114 will operate through the crank 152 and pin 153 to shift the flag 155 laterally with respect to the view finder 120. Thus, the flag 155 will shift transversely across the view finder 120 from a leftward position, as viewed in FIG. 5, to a rightward position when the lens barrel 114 is shifted from an outer "near" focus position to an inner "far" focus position. The lower flag portion 156 will mask either the "far" or "near" focus indicia provided on the tab 140 as this lens barrel shifting occurs. The camera system 100 thereby automatically provides indicia in the view finder 120 of the focusing condition of the primary lens system 112.

Although the invention has been described with a certain degree of particularity, it should be understood that the present disclosure has been made only by way of example. Consequently, numerous changes in the details of construction and the combination and arrangement of components as well as the possible modes of utilization, will be apparent to those familiar with the art, and may be resorted to without departing from the spirit and scope of the invention.

What is claimed is:

1. In a camera system, a primary lens system having a plurality of focusing positions to create a plurality of focus conditions;
    a movable lens barrel incorporated in said primary lens system and shiftable between first and second focus positions to create first and second focus conditions, respectively, for said lens system;
    a viewfinder system for viewing a scene image corresponding to a scene image transmitted by said lens system;
    light transmission means optically coupled to said viewfinder;
    first and second focus condition indicia positioned within said viewfinder system and arranged to be illuminated by said light transmission means and visable within said viewfinder to create visual focusing indicia within said viewfinder; and
    masking means comprising a movable flag pivotally mounted in the light path of said light transmission means and linked to said lens barrel by connecting means which responds to the movement of said barrel by moving said flag into selected positions which mask the illumination of one of said focus condition indicia and permit the light transmitted by said light transmission means to illuminate the other focus condition indicia, so that the focus condition indicia illuminated within said viewfinder represents the focus position of said lens barrel.

2. The camera system in accordance with claim 1 wherein said movable lens barrel is axially shiftable and further wherein said connecting means comprises a sliding pin spring-biased into engagement with said lens barrel and coupled to said movable flag.

3. The camera system in accordance with claim 2 wherein said light transmission means comprises a pair of angled mirrors optically arranged to reflect light from said primary lens system through said view finder to illuminate said focus condition indicia and further wherein said flag is pivotally mounted adjacent one of said mirrors to block out a selected portion of the reflected light directed toward said focus condition indicia.

4. The camera system in accordance with claim 1 wherein said connecting means comprises a crank arm linked to said lens barrel and coupled to said pivoted flag.

5. The camera system in accordance with claim 4 wherein said focus condition indicia are provided on a transparent member arranged transversely across said view finder and further wherein said movable flag swings transversely across the field of view of said view finder to selectively mask the illumination of said focus condition indicia in response to the movement of said lens barrel.

* * * * *